US012786278B2

(12) United States Patent
Pratt et al.

(10) Patent No.: US 12,786,278 B2
(45) Date of Patent: Nov. 3, 2026

(54) SYSTEMS AND METHODS FOR MANAGING NETWORK BASED COMMUNICATIONS WHEN COMMUNICATING WITH A MONITORED FAMILY MEMBER

(71) Applicant: AT&T Intellectual Property I, L.P., Atlanta, GA (US)

(72) Inventors: James H. Pratt, Round Rock, TX (US); Eric Zavesky, Austin, TX (US); Inderpreet Singh Ahluwalia, Austin, TX (US); Gregory W. Edwards, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 92 days.

(21) Appl. No.: 19/035,115

(22) Filed: Jan. 23, 2025

(65) Prior Publication Data

US 2026/0214147 A1 Jul. 23, 2026

(51) Int. Cl.
*H04L 67/306* (2022.01)
*H04L 67/75* (2022.01)

(52) U.S. Cl.
CPC ............ *H04L 67/306* (2013.01); *H04L 67/75* (2022.05)

(58) Field of Classification Search
None
See application file for complete search history.

(56) References Cited

U.S. PATENT DOCUMENTS

| | | | | |
|---|---|---|---|---|
| 2020/0311993 | A1* | 10/2020 | Dowlatkhah | G06F 3/147 |
| 2021/0243160 | A1* | 8/2021 | Francis | G06Q 30/0641 |
| 2023/0350487 | A1* | 11/2023 | Tan | G06F 3/017 |
| 2024/0037674 | A1* | 2/2024 | Brenna | H04L 67/306 |
| 2026/0059180 | A1* | 2/2026 | Samal | H04N 21/8456 |

* cited by examiner

*Primary Examiner* — Fadi Haj Said
(74) *Attorney, Agent, or Firm* — Guntin & Gust, PLC; John G. Rauch

(57) ABSTRACT

Aspects of the subject disclosure may include, for example, receiving content related to a communication between a first user and at least one other user, analyzing the content to derive at least one communication behavioral trait of the first user, and presenting to the first user at a user device of the first user, information about the at least one communication behavioral trait, the presenting to provide insight to the first user about how the first user communicates. Other embodiments are disclosed.

20 Claims, 13 Drawing Sheets

289

200

200

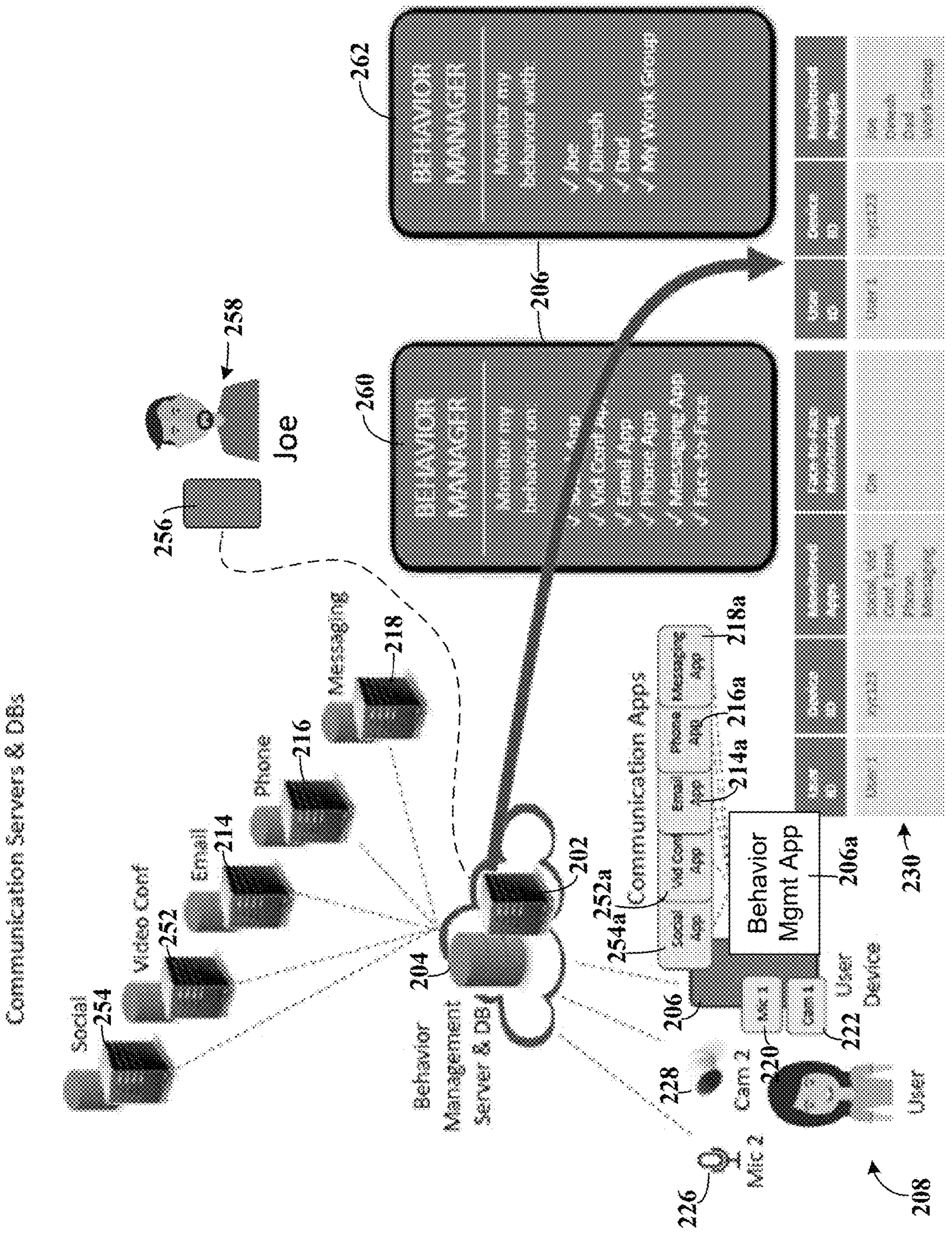
250 FIG. 2D

600

SYSTEMS AND METHODS FOR MANAGING NETWORK BASED COMMUNICATIONS WHEN COMMUNICATING WITH A MONITORED FAMILY MEMBER

FIELD OF THE DISCLOSURE

The subject disclosure relates to a systems and methods for managing network-based communications when communicating with a monitored family member.

BACKGROUND

A problem exists in that family members do not have a convenient means by which to monitor how they behave in communications activities or how they are perceived by others with whom they communicate, especially when using electronic devices to communicate over a network. This is particularly important when the family member is communicating with a monitored family member, such as a child or aging parent.

BRIEF DESCRIPTION OF THE DRAWINGS

Reference will now be made to the accompanying drawings, which are not necessarily drawn to scale, and wherein:

FIG. 2D is a block diagram illustrating a third example, non-limiting embodiment of a system functioning in conjunction with the communication network of FIG. 1 of FIG. 2A.

DETAILED DESCRIPTION

Figure 1:
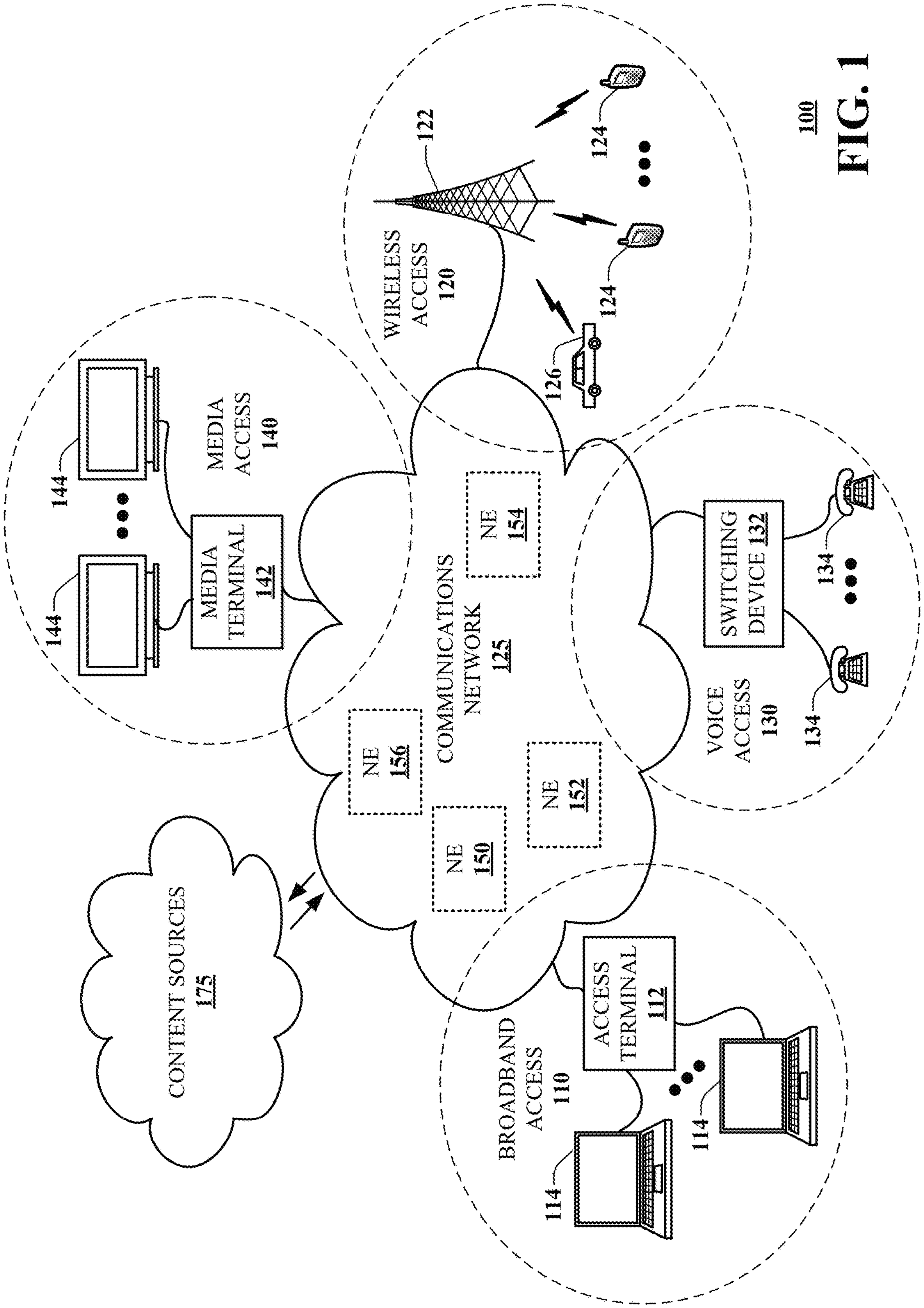
FIG. 1 is a block diagram illustrating an exemplary, non-limiting embodiment of a communications network in accordance with various aspects described herein.

The subject disclosure describes, among other things, illustrative embodiments for monitoring and analyzing user communications to provide insights into communication behaviors, particularly with monitored family members. It utilizes a networked user device equipped with a behavior management application that interfaces with various communication applications and external sensors to collect and analyze data using AI and machine learning techniques. The system provides feedback to the user, enhancing the user's understanding of communication patterns and improving interactions with specific individuals. Other embodiments are described in the subject disclosure.

One or more aspects of the subject disclosure include receiving content related to a communication between a first user and at least one other user, analyzing the content to derive at least one communication behavioral trait of the first user, and presenting to the first user at a user device of the first user, information about the at least one communication behavioral trait, the presenting to provide insight to the first user about how the first user communicates.

One or more aspects of the subject disclosure include receiving data of a communication between a first user and a second user, the communication including declarations by the first user to the second user, the declarations made using one or more of a plurality of communication methods, analyzing the data of the communication to identify at least one communication behavioral trait of the first user, wherein the analyzing comprises detecting first information about a statement by the first user and detecting second information about a response to the statement by the second user, and presenting, at a user device of the first user, information about the least one communication behavioral trait of the first user, wherein the information about the least one communication behavioral trait of the first user is based on the first information and the second information, wherein the presenting the information about the least one communication behavioral trait of the first user comprises providing feedback based on the analyzing to assist the first user in understanding how the first user communicates to the second user.

One or more aspects of the subject disclosure include receiving content data of a communication between a first user and at least one other user, the content data communicated between a first user device of the first user and a second user device of the second user, analyzing the content data to identify at least one communication behavioral trait of the first user, wherein the analyzing the content data comprises providing at least a portion of the content data to an artificial intelligence or machine learning process and receiving information about the at least one communication behavioral trait of the first user from the artificial intelligence or machine learning process, and presenting, to the first user, insight information as feedback to assist the first user in understanding how the first user communicates to the at least one other user, wherein the insight information is based on the information about the at least one communication behavioral trait of the first user.

Referring now to FIG. 1, a block diagram is shown illustrating an example, non-limiting embodiment of a system 100 in accordance with various aspects described herein. For example, system 100 can facilitate in whole or in part collecting content from a conversation by a first user with other users, analyzing the content to identifying a communication behavioral trait of the first user and present information about the communication behavioral trait to the user as feedback to provide the user with insight about how the user communicates, especially using electronic media. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
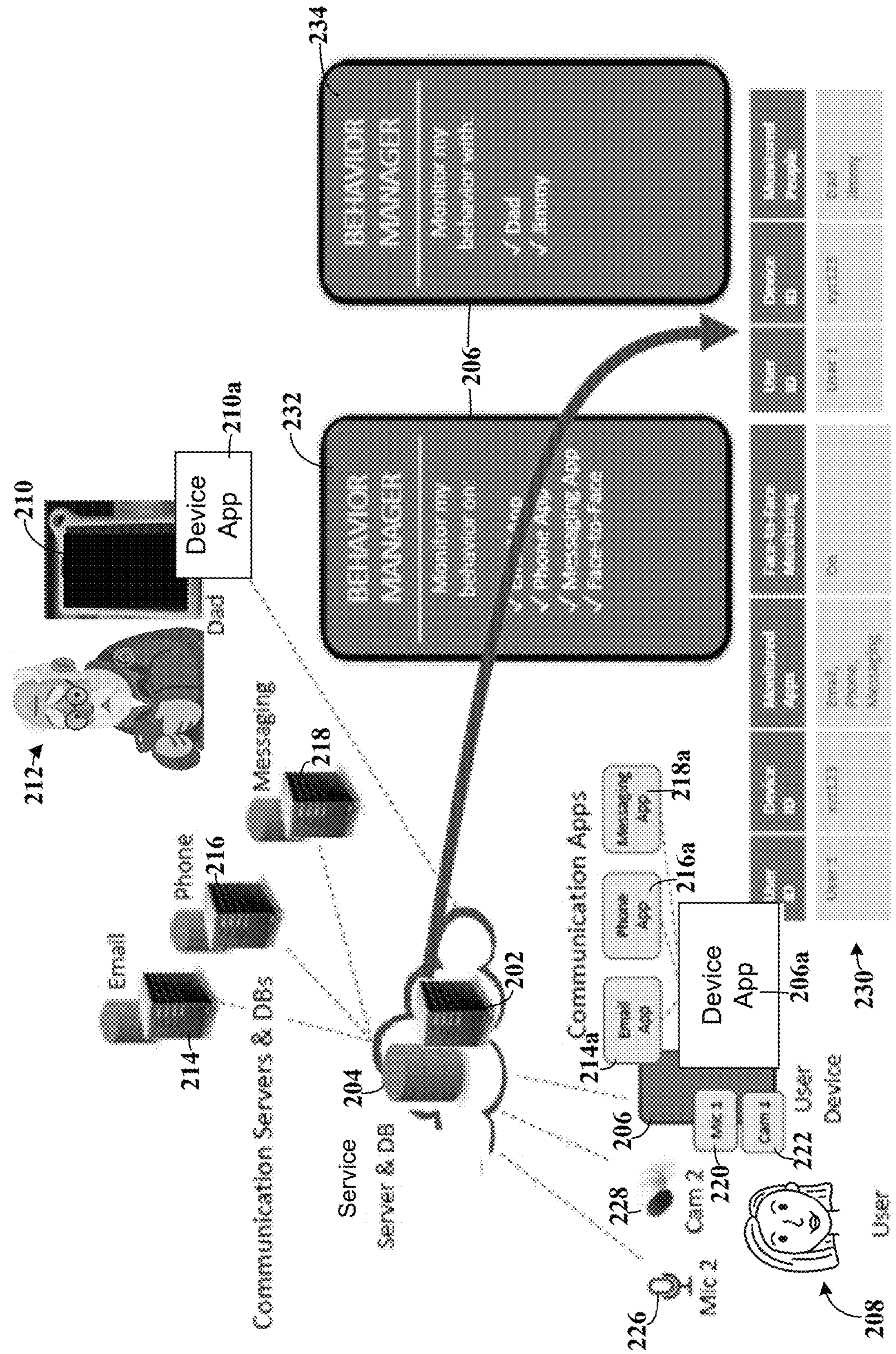
FIG. 2A is a block diagram illustrating an example, non-limiting embodiment of a system functioning in conjunction with the communication network of FIG. 1 in accordance with various aspects described herein.

FIG. 2A is a block diagram illustrating an example, non-limiting embodiment of a system 200 functioning in conjunction with the communications network 125 of FIG. 1 in accordance with various aspects described herein. The system 200 can be implemented using the communications network 125 depicted in FIG. 1, which integrates various access methods such as broadband, wireless, voice, and media access. The network elements (NE) within the communications network 125 facilitate connectivity and data exchange between user devices, such as mobile phones, laptops, and media terminals, and content sources. By leveraging this network infrastructure, the system 200 can monitor and analyze communications between users, providing insights into communication behaviors across different channels, including text, voice, and video, thereby enhancing the user's understanding of their interactions with monitored family members.

Aspects of the present disclosure relate to a solution to enable an individual to gain insights about and to manage their behavior regarding their communications with another person. In an exemplary embodiment, the communications are between closely related people such as a family member and another family member or between coworkers such as a supervisor and employee. In a particular example, a first person such as a family member uses an application to obtain insights as to how they communicate with a second person, such as a monitored family member. The monitored family member may be, for example, a child or aging parent.

Interpersonal communications such as these may be carried out in person or using the widest variety of electronic devices. For example, coworkers may text one another using a short message service or a texting application on a portable device such as a mobile phone. In another example, family members may make video calls using an application which establishes a call over network facilities between respective user devices such as mobile phones, tablet computers and laptop computers. In other examples, two friends may communicate via electronic mail (email) using mobile devices, laptop or desktop computers, or other devices.

When communicating over such electronic channels, a first person may not be aware of the tone or expression or attitude that is being perceived by a second person who receives the communication. As an example, sarcasm is notoriously difficult to convey in written text.

Parties to a communication, including for example, family members, do not have a good means to understand how they come across in their communications to others. This may apply to how the user communicates in scenarios including one-to-one, in which a user communicates with one other known person or family member, such as a face-to-face talk or a text; one-to-many known parties, such as a user communicates with more than one other known parties or family members, such as a broadcast email, and one-to-many unknown parties, such as a user communicates with more than one other known person, at least one of whom is unknown. An example of this last is a public social media post.

The presence and interposition of the electronic elements and the network thus create a technical problem in that a source of a communication may be unaware of how they communicate with another person or persons. This is particularly true in media such as text and email where any response from a recipient is textual only and wherein the response may be delayed until the recipient actually receives the message. However, this is also true in live communications such as video calls or audio calls where both parties participate concurrently. This may be also true in live, face-to-face communications between the parties. The first person generally has no feedback available and can gain no insight about how they communicate and how they are perceived when using electronic channels.

A similar technical problem arises in the case of social media communications. Generally, a first user will post a comment on a social media application or website using a user device such as a mobile phone. The comment may be an original posting or a comment in response to another user's posting. The comment may be textual and verbal or may be non-verbal, for example using Emoji to convey a feeling or opinion or response. Again, because of the limitations and artificiality of the online environment, the user may have no real sense of how the user is communicating on social media. This may limit the user's effectiveness at communicating or create unintended responses from other users, such as hostility at a misperceived intention on the part of the first user. Again, the first user generally has no feedback available about their social media interactions and can gain no insight about how they communicate and how they are perceived when using such electronic channels.

FIG. 2A provides a detailed illustration of a system 200 that functions in conjunction with the communications network 125 described in FIG. 1. This system 200 operates to monitor and analyze user communications to provide insights into communication behaviors, particularly when interacting with monitored family members. The system includes a server 202 and database 204 that implement a communication behavior insight service. The communication behavior insight service may be accessed by users operating user devices such as first user 208 operating first user device 206 and second user 212 operating second user device 210.

User devices including the first user device 206 and second user device 210 communicate over a network using any aspect of the communications network 125 depicted in FIG. 1, for example. Communication may be according to any suitable service or application. In the example of FIG. 2A, communication services are provided by an email server 214, a voice server 216, and a text messaging server 218. Other communication methods or services may be provided or available as well.

The user device user as first user device 206 is a central component of the system. The user device 206 includes communication facilities such as applications, including email application 214*a*, voice application 216*a*, and messaging application 218*a*. These respective applications cooperate with the email server 214, the voice server 216 and the messaging server 218 to provide the indicated communication service. Further, to provide or participate in the communication behavior insight service, the user device 206 includes a device application or app 206*a* that cooperates with the server 202.

The user device 206 can be any suitable communication device or device equipped for data communication such as a smartphone, tablet, or any portable computing device that the user employs for communication. The user device 206 is networked and location-aware, allowing it to interact with various communication apps and external sensors. The user device 206 includes a user interface which may include a display, a keyboard, touch-sensitive display, a microphone 220 and a camera 222.

The device app 206*a* acts as an intermediary between the user and the communication apps. The device app 206*a* is responsible for collecting communication data, interfacing with the behavior manager, and presenting insights to the user. The device app 206*a* can be configured to monitor specific communication channels and interactions with designated individuals. These communication apps represent different methods of communication available on the user device, such as email, phone, and messaging. As indicated, each app communicates with its respective server and database to facilitate data exchange and storage.

The second user device 210 may similarly be any suitable communication device or device equipped for data communication such as a smartphone, tablet, or any portable computing device that the user employs for communication. In embodiments, the second user device 210 is networked and location-aware, allowing it to interact with various communication apps and external sensors. The second user device 210 may also include user interface features such as a camera and microphone (not shown). Further, the second user device 210 includes a device app 210*a* which acts as an intermediary between the second user 212 and the communication behavior insight service provided by the server 202, as well as the device app 206*a* of the first user device 206. The device app 210*a* is responsible for collecting communication data, interfacing with the communication behavior insight service, and presenting insights to the first user 208. The second device app 210*a* can be configured to monitor specific communication channels and interactions with designated individuals.

In some embodiments, the system 200 may include or interact with other data collection devices for collecting information about a communication or other interaction between the parties such as the first user 208 and the second user 212. External sensors, such as microphone 226 and camera 228, may be available to capture audio and visual data during communications. For example, a face-to face-communication may occur between two parties such as first user 208 and second user 212 in a location where sensors such as the microphone 226 and the camera 228 are located. These sensors provide real-time input that can be analyzed to assess communication behaviors. Ambient sensors, which are not directly owned by the user but are located in the vicinity, are location-aware and can detect the user's presence and interactions, particularly in face-to-face communications. They provide additional data that can be used to analyze communication behaviors.

The server 202 and database 204 host the communication behavior insight service and are responsible for processing the communication data collected by the first device app 206*a* and the second device app 210*a*, and other data sources. In embodiments, the server 202 and database 204 apply artificial intelligence (AI) and machine learning (ML) techniques (collectively, AI/ML techniques) to analyze the data and derive communication behavioral traits of a user such as the first user 208.

The communication behavior insight service analyzes communication data to identify behavioral traits such as tone, responsiveness, and attitude. The communication behavior insight service uses predefined criteria and AI/ML models to assess these traits and to provide feedback to the user such as the first user 208.

FIG. 2A illustrates an exemplary record 230 of the database 204 of the communication behavior insight service. The communication behavior insight service may be provided on a subscription basis for example, with users such as the first user 208 paying a fee for access to the service. In the example the record 230 includes data fields for a user identifier for the first user 208 and a device identifier for identifying a device of the first user 208. For example, the first user may have multiple devices used for communications with other parties such as a tablet for communication with family members, a laptop computer or mobile device for communication with work colleagues, etc. The first user 208 may specify which of these devices the communication behavior insight service is to be applied to in order to tailor access for the user. The record 230 may further include data fields selection of monitoring of face-to-face communications. Such monitoring may occur when the user and the other party are in the vicinity of connected devices such as the microphone 226 and the camera 228 that can collect audio and video information for storage in the database 204 in connection with the service.

In example embodiments, a user such as the first 208 user uses the first device app 206*a* to register themselves and the first user device 206 in the database 204. This creates a record such as record 230 that specifies which of their apps are to be monitored for behavior and also whether their face-to-face communications should be monitored.

Further, the database record 230 may also contain one or more communication identifications for each of the monitored family members (such as an aging parent and a child. In the figure, the parent is identified as "Dad," and the child is identified as "Jimmy." For each other party to be monitored, such as the family members, their communication addresses for messaging, phone, and email apps is stored.

In the exemplary embodiment, the device app 206*a* forms a user interface to the communication behavior insight service which allows a user such as the first user 208 to configure the communication behavior insight service. Such configuration may include specifying which communication channels or methods to monitor, specifying which individuals to monitor, and specifying which user devices to monitor. The communication behavior insight service also presents the analyzed insights to the user, helping them understand their communication patterns and improve interactions with other parties such as monitored family members.

FIG. 2A shows the display 232 of the first user device 206 confirming user selections for which communication apps or communication methods to monitor the user's behavior, including email, telephone, messaging and face-to-face communications. Further, the display 234 shows identifications of other parties for whom the user has selected to have user communications monitored, including Dad and Jimmy in this example. In embodiments, the system can monitor conversations or communications among multiple participants, such as a family communication using a messaging application or a video call among multiple coworker participants. The user can select or specify which communication, if any, with any participant is to be monitored by the system 200.

The system can be configured to focus on specific individuals, such as family members, with whom the user frequently communicates. The behavior manager tailors its analysis to these interactions, providing targeted insights. Overall, the system leverages the capabilities of the communications network to provide a comprehensive solution for monitoring and analyzing user communications, offering valuable insights into communication behaviors and enhancing the user's understanding of their interactions with monitored family members.

The system 200 may implement a registration process by which the first user 208 initiates or activates the service and selects the communication methods or apps on which user communications will be monitored and the other parties whose interactions with the first user will be monitored. Any other suitable option selections may be made or information may be provided during the registration process. Further, the user may later access the first device app 206*a* on the user device 206 to modify or update these user selections.

In general, when the first user is employing the system 200 to monitor a conversation and evaluate the user's performance, other parties are advised of the monitoring in order to maintain their privacy or confidentiality. For example, when the communication behavior insight service begins operating, an audio or text message may be provided to participants advising that the conversation is being monitored. The participants may be required to affirmatively agree to the monitoring of their communications for the service to continue. This opt-in or confirmation may be required for all one-on-one communications or one-to-many communications, such as group emails and text messages. In a case where user communications are broadcast, such as a social media posting, no such affirmative acceptance of the service may be required of other users seeing the broadcast communication. However, some or all of the messages of the first user may include disclaimer language explaining the service and indicating that, by responding, the user is agreeing to have his communications collected and monitored.

Figure 2B:
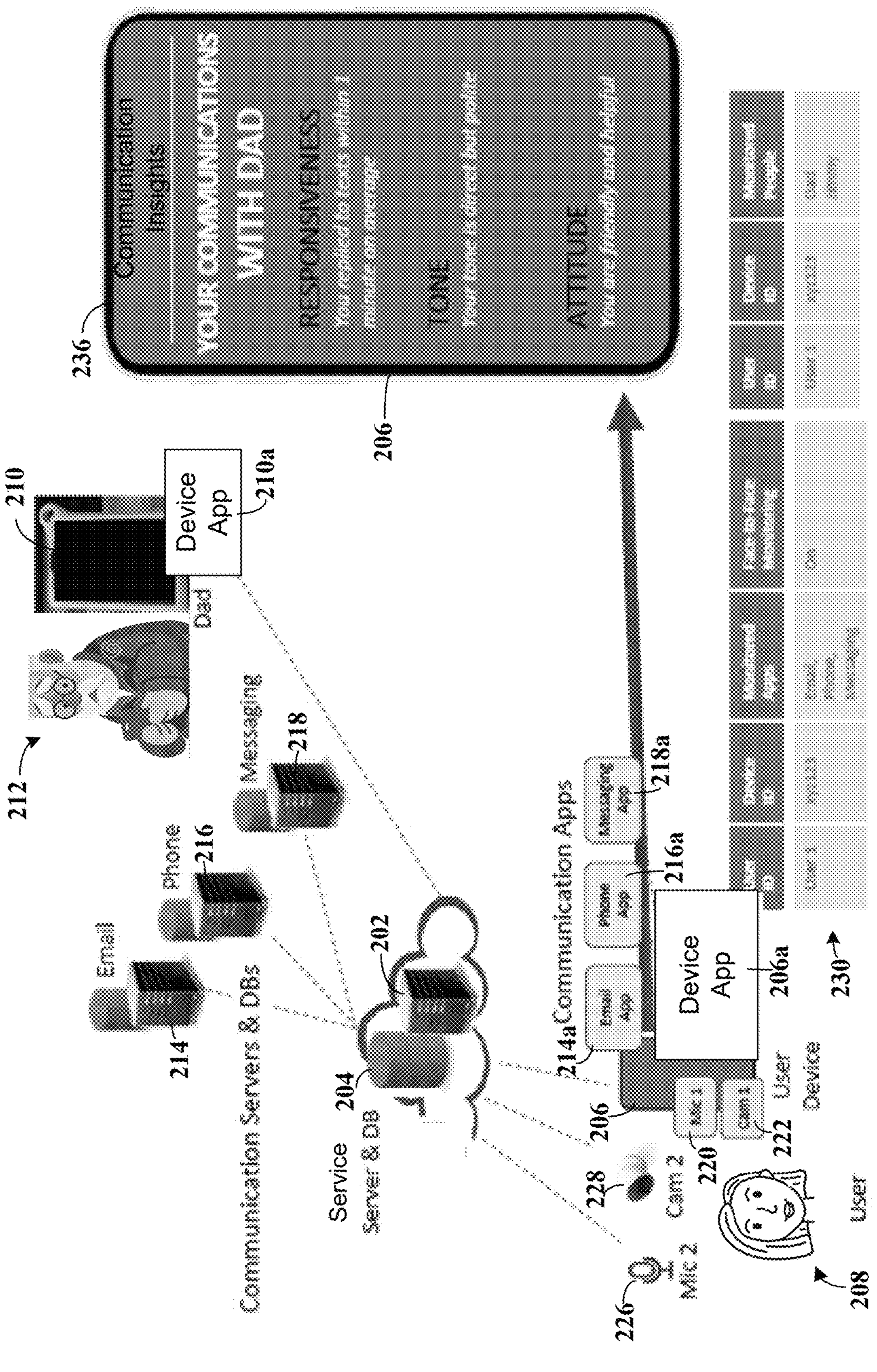
FIG. 2B is a block diagram illustrating a second example, non-limiting embodiment of the system of FIG. 2A.

FIG. 2B is a block diagram illustrating a second example, non-limiting embodiment of the system of FIG. 2A. FIG. 2B illustrates an example of feedback provided by server 202 operating the communication behavior insight service following a text communication between the first user 208 and the second user 212. In the example, the second user 212 is the father of the first user. The service operates to give to the first user 208 insights as to how they communicate with a monitored family member, such as a child or aging parent, second user 212.

In the example, if the user has selected to monitor text messaging communications, messaging content between participants to a communication such as the monitored family members is sent from the messaging app, including the first device app 206*a* and the second device app 210*a*, to the server 202 for analysis. The analysis may be conducted using any suitable AI and other analysis techniques to distinguish trends in the user's text communications with the monitored family member, in this case Dad or second user 212.

The first user 208 may, via settings in the first device app 206*a*, select one or more types of behaviors to monitor. For example, the first user 208 may wish to monitor their text messaging behavior as it relates to their responsiveness, their tone, and their overall attitude with the monitored family member. These map to specific AI criteria that the server applies to the analysis and the results are presented to the user on either a request or alert notification basis, as shown in FIG. 2B. In example, the communication behavior insight service reports on display 236 that, for responsiveness, the user "replied to texts within 1 minute on average. Further, with respect tone, the user's tone is "direct but polite." Still further, with respect to attitude, the user is detected to be "friendly and helpful." The user may select any suitable criteria for detection and evaluation by the communication behavior insight service.

Moreover, similar methods may be used to analyze behavior regarding email communication of user behavior, or any other type of written, textual communication by the first user 208.

Figure 2C:
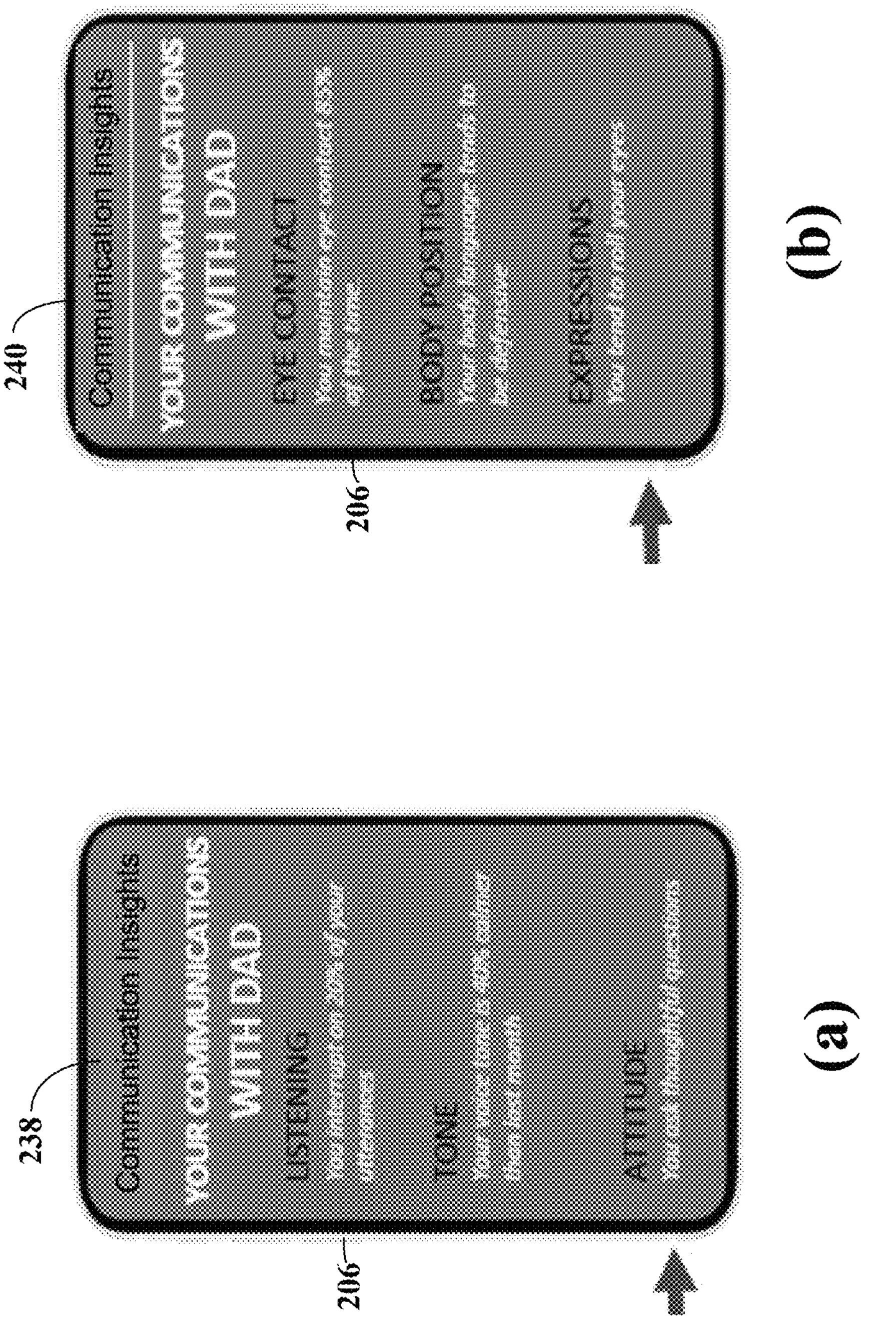
FIG. 2C illustrates exemplary information results provided by the system of FIG. 2A.

FIG. 2C illustrates further exemplary information results provided by the system 200 of FIG. 2A. In this example, FIG. 2C(a) illustrates an example of feedback provided by server 202 operating the communication behavior insight service following a voice communication between the first user 208 and the second user 212. Similar to monitoring text communications, the first user 208 may select to have communications using a phone application or voice application monitored with selected other users such as family members. The voice content from both parties may be detected by microphones including the microphone 220 of the first user device 206 as well as microphones such as microphone 226 in the vicinity of a face-to-face communication. The respective microphones convert detected sound to digital data which is conveyed over a network and provided to the server 202 of the communication behavior insight service. The server 202 analyzes the voice data to determine and identify particular communication behaviors of the first user 208 when communicating with the second user 212.

Any suitable feedback may be provided to the first user by the communication behavior insight service based on this analysis. In the example, the feedback is presented on a display of the first user device 206 as a series of brief textual descriptions. In this example, with respect to listening, the first user is advised that "you interrupt on 20% of your utterances." With respect to the tone of the first user 208, the user is advised, "Your voice tone is 40% calmer than last month." With respect toward attitude of the first user 208, the user is advised, "you ask thoughtful questions."

In some examples, more detailed feedback may be available. For example, the user may click on the user display of the first user device 206 to see a more detailed discussion of any communication behavior of interest. Such detailed presentation may be available through other devices such as a laptop computer and using different media, such as sound or video. As is suggested in FIG. 2C(a), the evaluation of the user's behavior may occur over, over a series of communications with the same other user. For example, if the first user 208 and the second user 212 talk weekly, the communication behavior insight service may monitor some or all of these conversations and develop and understanding of a long-term pattern of the first user's communication behavior.

Such information as "your voice tone is 40% calmer than last month" may be used by the first user to modify and improve a particular communication aspect or behavior. This may be especially useful for communication behaviors that are not consciously expressed. The user has little or no idea how the user communicates, including with a particular family member such as Dad, second user 212. This may also be especially useful for users with cognitive challenges such as someone with a spectrum disorder that may value learning how their facial expressions or mannerisms may be perceived. Similarly, for a first person interacting with a second person with a spectrum disorder, feedback about how facial expressions or mannerisms of the first person are perceived by the second person may be very valuable. The communication behavior insight service provides the analysis and feedback that may create self-awareness for the first user 208 and the opportunity for modification and improvement. Additionally, for certain instances of particularly detrimental behaviors, the system may employ methods of redaction for those events (e.g. specific negative posts) or as a preventative measure for a period of time or topic (e.g. any discussion of politics germane to specific keywords).

FIG. 2C(b) provides an example of feedback provided by server 202 operating the communication behavior insight service following a face-to-face communication between the first user 208 and the second user 212. In some instances, the user may wish to monitor their behavior as it relates to face-to-face communications with others. In this case, the user does not use their device for the purpose of conducting the communication. Rather, sound and video for the communication may be captured by nearby sensors such as the microphone 226 and the camera 228.

In one embodiment, the first user device 206 may communicate its location with the behavior management server 202 which also has access to a database of ambient cameras and microphones and other sensors and their locations including the microphone 226 and the camera 228. The first user device 206 may determine its own location using any suitable technique such as based on an onboard Global Positioning System (GPS) radio or through network triangulation. Based on this location information, the behavior management server 202 may at any time determine which cameras and microphones are within range of the user. If a camera or microphone recognizes a user based on facial or speech recognition, it may also detect the user initiating a communication with another person. In doing so, the camera and microphone may monitor the content of the communication by sending it to the behavior management server 202 for analysis as described previously. The server 202 analyzes the voice data to determine and identify particular communication behaviors of the first user 208 when communicating with the second user 212.

Any suitable feedback may be provided to the first user by the communication behavior insight service based on this analysis. In the example, the feedback is presented on a display of the first user device 206 as a series of brief textual descriptions. In this example, with respect to listening, the first user is advised that "you maintain eye contact 85% of the time." With respect to the body position of the first user 208, the user is advised, "Your body language tends to be defensive." With respect to facial expressions of the first user 208, the user is advised, "you tend to roll your eyes."

Any other suitable feedback may be provided. Moreover, the nature of the feedback for any particular method of communication or channel of communication (e.g., text, online voice, online video, face-to-face), the feedback may be tailored to the particular method. Thus in FIG. 2C(b), the feedback includes information about the user's body position. For a voice communication, such information would likely not be available so would not be present. On the other hand, the user's tone of voice, rapidity of speech, level of vocabulary (e.g., simple words, simple sentences instead of compound sentence with multi-syllable words or more abstract concepts) may be analyzed and reported on in feedback for all types of communication.

FIG. 2D is a block diagram illustrating a third example, non-limiting embodiment of a system for a communication behavior insight service, system 250. The exemplary system 250 includes features similar to those of system 200 in FIG. 2A. Further, the system 250 is expanded to include other types of communication that the first user 208 may participate in.

FIG. 2D includes a video conferencing server 252 and a social media server 254. The first user device 206 includes a video conferencing application (app) 252*a* and a social media application 254*a*. Each respective application operates in conjunction with the respective servers to provide a particular communication service for the first user 208 accessing the first user device 206. The video conference app 252*a* and the video conferencing server 252 enable the first user to participate in video conferences with other participants. The other participants may include family members such as Dad illustrated in FIG. 2A. Moreover, in embodiments, the other participants may include friends, coworkers and others such as user 258, identified as Joe in FIG. 2D, with user device 256.

The social media app 254*a* and the social media server 254 enable the first user 208 to access social media sites using the first user device 206. For example, the first user 208 may post information, opinions and other content on the social media sites for viewing by other participants. The postings to social media are generally in the nature of broadcast communications or one-to-many communications by the first user 208.

FIG. 2D expands on the system architecture presented in FIGS. 1 and 2A, illustrating a more comprehensive setup for monitoring and analyzing user communications. The communications network 125 from FIG. 1 provides the necessary infrastructure for connectivity and data exchange between user devices and content sources. In FIG. 2A, the user device 206, equipped with a device app 206*a*, interacts with communication apps such as email application 214*a*, phone or voice application 216*a*, and messaging application 218*a*, which communicate with their respective servers 214, 216, and 218. The device app 206*a* collects communication data and interfaces with the service server and database 204, which hosts the communication behavior insight service.

In FIG. 2D, similar to FIG. 2A, the database 204 includes records such as record 230. Users such as the first user 208 may register with the communication behavior insight service and select the types of communications to monitor and the individuals with which their communications are monitored. Information about the user's identification ("User 1") and the devices ("xyz123") for which communication should be monitored is provided by the user and stored in the database record. Further, the people ("Dad," "Joe," "Dinesh") or groups of people ("Work Group") are specified by the user and stored in the record.

In the example embodiment, the communication behavior insight service may present a user interface on the display of the user device 206. For example, user interface 260 shows what applications or communication methods or channels are to be monitored by the service, including a social media app, a video conferencing app, an email app, and others. The user may interact with the user interface of the first user device 206 to add or remove specific applications from the analysis of the service. Further, user display 262 allows the user to specify which communications with individual users or groups of users are to be monitored by the service. Individuals may be added or removed by user interaction with the user interface 262. Any other suitable manner of controlling settings of the communication behavior insight service may be used as well.

When the first user 208 initiates a communication, the communication behavior insight service identifies the first user 208, the other participants in the communication and the devices involved. If this information matches the record 230 of the database 204, the communication behavior insight service may begin monitoring the conversation. As indicated, in embodiments, the other participants are generally advised of the activity of the communication behavior insight service to monitor their participation and receive their confidential information. The communication behavior insight service may only proceed if all participants agree to participate and have their information collected and analyzed. In some embodiments, provision may be made to anonymize the information of the participants other than the first user to preserve personal information and confidentiality.

The system 250 may focus on specific individuals, such as Joe, user 258, with whom the first user 208 frequently communicates. The communication behavior insight service tailors its analysis to these interactions, providing targeted insights. As noted, the first user 208 can specify which individuals to monitor, including Joe, Dinesh, Dad, and a work group. This setup enhances the user's understanding of their communication patterns and improves interactions with monitored individuals. The system leverages the capabilities of the communications network 125 and the architecture in FIG. 2A to provide a comprehensive solution for monitoring and analyzing user communications.

Figure 2E:
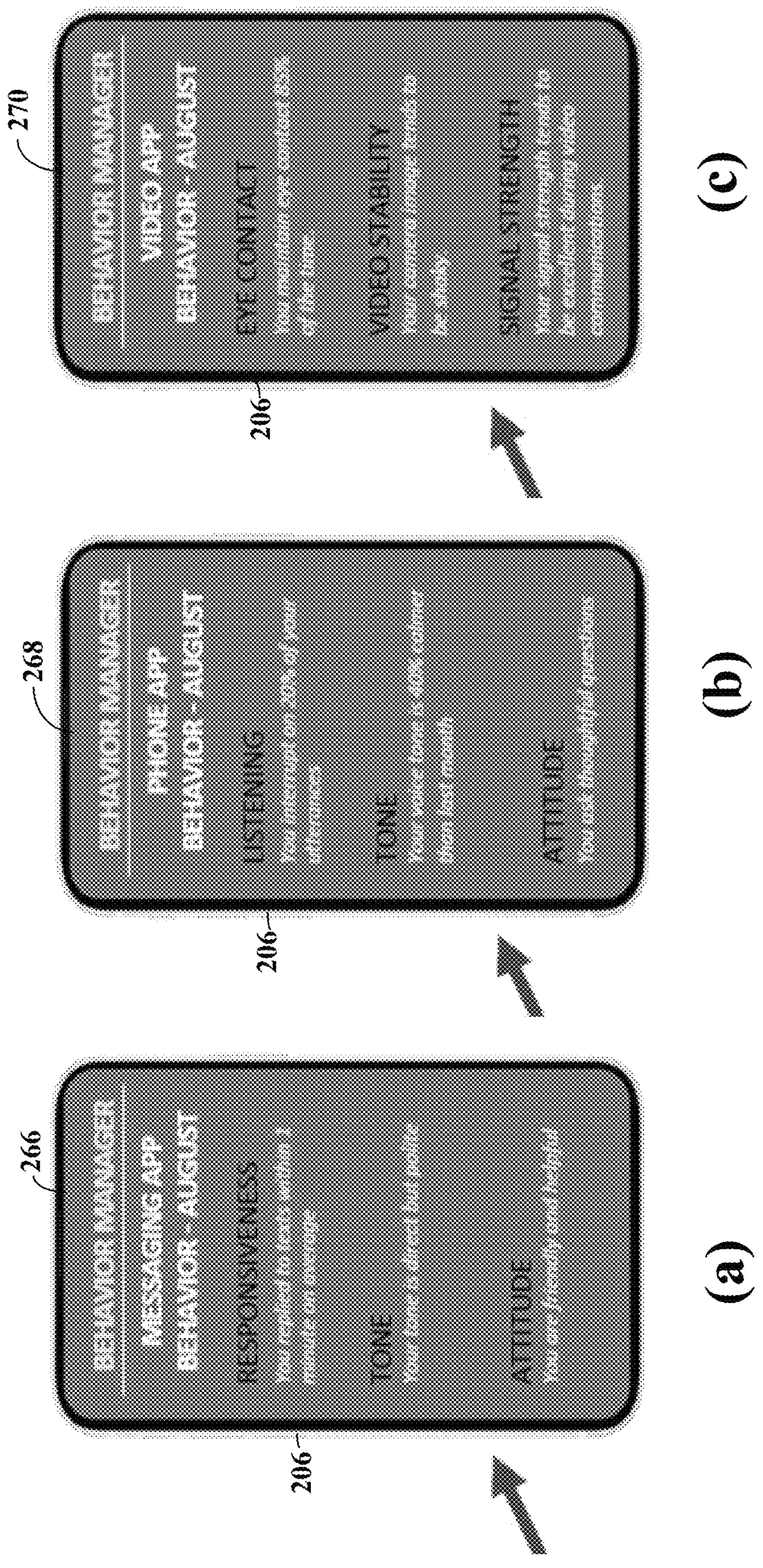
FIG. 2E illustrates exemplary information results provided by the system of FIG. 2D.

FIG. 2E illustrates further exemplary information results provided by the system 250 of FIG. 2D. In this example, FIG. 2E illustrates an example of feedback provided by server 202 operating the communication behavior insight service as a monthly summary for the month of August. For example, FIG. 2E(a) provides feedback based on monitoring the text communication activity (e.g., texting and email) of the first user during the month.

For example, if the user has selected to monitor text messaging communications, all messaging content may be sent from the messaging app 218*a* to the server 202 for analysis. The analysis may be conducted using known AI and other analysis techniques to distinguish trends in the user's text communications. The first user 208 may, via settings in the behavior management app, select one or more types of behaviors to monitor. For example, the user may wish to monitor their text messaging behavior as it relates to their responsiveness, their tone, and their overall attitude. These may map to specific AI criteria that the server applies to the analysis and the results may be presented to the user on either a request or alert notification basis, as shown in FIG. 2E(a). Similar methods may be used to analyze behavior regarding email communication behavior.

Thus, FIG. 2E(a) shows user interface 266 reporting feedback. For the month of August, the user's responsiveness is reported as, "you replied to texts within 1 minute on average." The user's tone is reported to be "direct but polite." The user's attitude is reported to be "friendly and helpful." Any set of characteristics or behavior may be selected or specified by the user for analysis and feedback.

In a similar manner, the user may elect to have their communications using the phone app 216*a* monitored to analyze their behavior. Voice content is provided by the behavior management app 206*a* to the server 202 for analysis and results may be presented again as shown. FIG. 2E(b) illustrates feedback based on voice communication. In this example, the user's listening performance is evaluated as "you interrupt on 20% of your utterances." Further, the user's voice tone is reported as "40% calmer than last month and the user's attitude is reported as "you ask thoughtful questions."

Further, in a similar manner, the first user 208 may elect to have their communications using the video conferencing app 252*a* monitored to analyze their behavior. For video app monitoring, additional types of behavior may be analyzed with results presented to the user based on an analysis of the video content. FIG. 2E(c) illustrates feedback based on voice communication. For example, the behavior management server 202 may analyze the user's eye contact over time and present summary results as shown in exemplary user interface 270. Also, the user's behavior may be represented to another party with which they communicate by means of the quality of the user's video communication as a proxy for behavior. So, for example, device data such as video stability and signal strength during video communication sessions may be sent to the behavior management server or it may derive them, for example via video analysis, to present results as shown in user interface 270. Thus, user interface reports that, "Your camera image tends to be shaky," and "your signal strength tends to be excellent during video communication." The server 202 may access any suitable information or sources of information to determine information about signal strength, signal quality, and other data. For example, a wireless router at the user's location may have stored information about signal quality features.

Figure 2F:
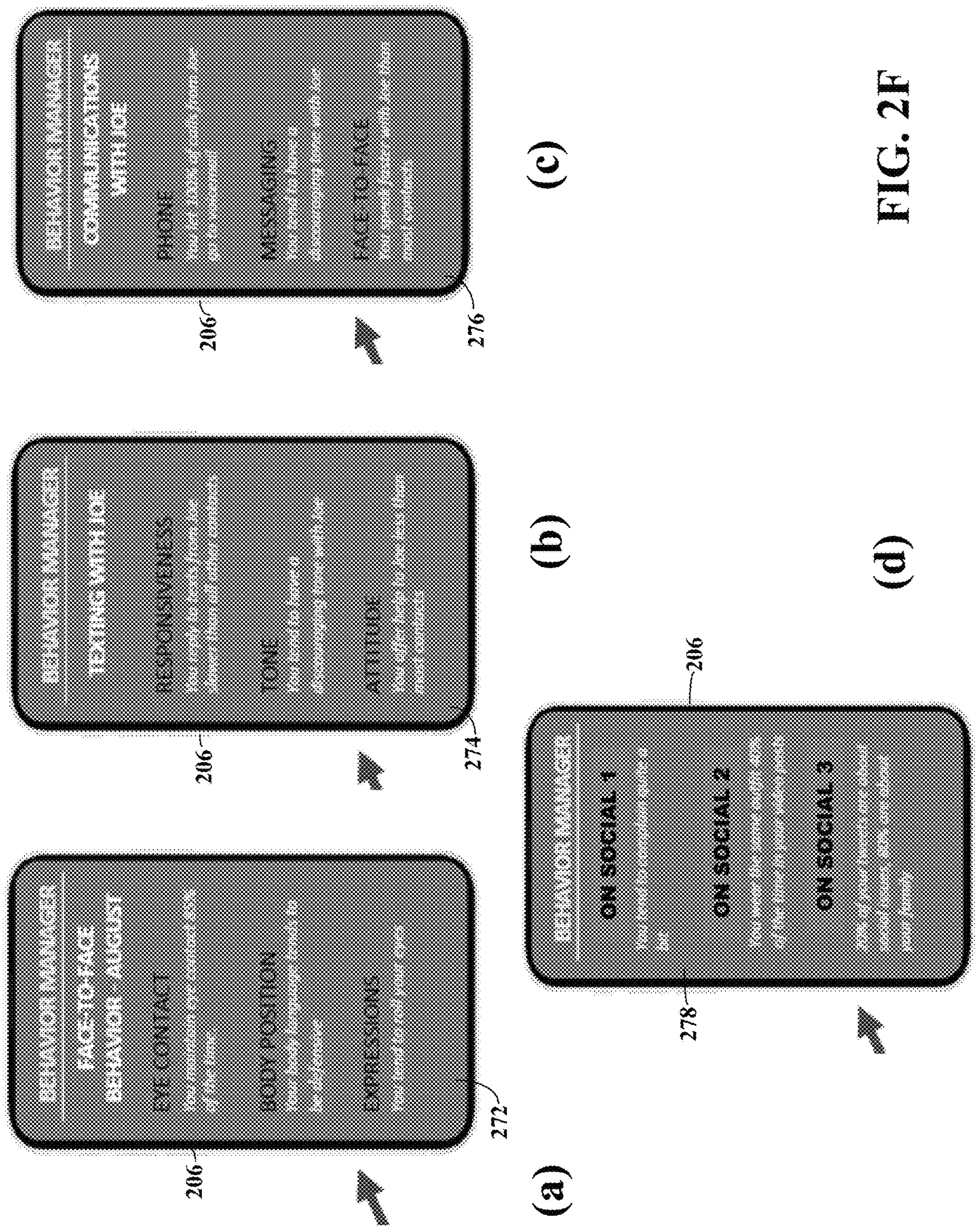
FIG. 2F illustrates exemplary information results provided by the system of FIG. 2D.

FIG. 2F illustrates further exemplary information results provided by the system 250 of FIG. 2D. In some instances, the user may wish to monitor their behavior as it relates to face-to-face communications with others. In this case, the user does not use their device for the purpose of conducting the communication. For example, the first user device 206 may communicate its location with the behavior management server which also has access to a database of ambient cameras and microphones and other sensors and their locations. Therefore, the behavior management server 202 may at any time determine which cameras and microphones are within range of the user. If a camera or microphone such as microphone 226 or camera 228 recognizes a user based on facial or speech recognition, it may also detect the first user 208 initiating a face-to-face communication with another person. The server 202 will consult database records such as record 230 of the database 204 to determine the appropriateness of monitoring the particular communication, including preexisting permission provided by participants. In doing so, the camera 228 and microphone 226 may monitor the content of the communication by sending it to the behavior management server 202 for analysis as previously.

FIG. 2F(a) illustrates a user interface 272 providing feedback to the user for face-to-face communications occurring during the month of August. In this example, the communication behavior insight service has determined that the user "maintains eye contact 85% of the time," and reports that "your body language tends to be defensive." Further, the service reports that the user "tends to roll your eyes." Any other suitable behavior aspects and feedback may be selected for monitoring by the user using, for example, the user interface on the user display of the first user device 206.

FIG. 2F(b) illustrates a user interface 274 providing feedback to the user for text communications with a particular individual, "Joe" in the example. In some cases, the first user 208 may wish to monitor their communications behavior with specific individuals. This monitoring and the feedback it produces may give the user a better insight as to how well they are engaged with these contacts and how they may improve their communication behaviors. For example, the same methods that have been described for analyzing communications with a family member can be used to monitor the user's communications with a specific contact, for example, their texting messages with Joe.

In FIG. 2F(b), the user interface 274 reports feedback based on the analysis. In this example, the user is advised that "you reply to texts from Joe slower than all other contacts," and "you tend to have a discouraging tone with Joe." Still further, the system 250 determines and reports, "you offer help to Joe less than most contacts." Such comparative feedback may only be available if the user has selected monitoring of multiple contacts. In this case, the same method is used by the behavior management server 202 to analyze content and draw conclusions about communication behaviors. However, only those communications with Joe are considered and included when the communication behavior insight service presents results related to texting with Joe, as shown.

FIG. 2F(c) illustrates a user interface 276 providing feedback to the user for communications across multiple methods or channels with a particular individual, "Joe" in the example. The first user 208 may also select an option in configurations for the behavior management app 206*a* to monitor more than one or even all of their communication methods with a specific individual. For instance, the user may wish to see an integrated presentation of results for all of the methods or channel by which they communicate with another specific user, as shown.

Thus, FIG. 2F(c) shows, for phone communications with Joe using the phone app 216 *a*, "you let 100% of calls from Joe go to voicemail," and for messaging app 218 *a*, "you tend to have a discouraging tone with Joe." If face-to-face communications with Joe and others have been detected and analyzed, the system 250 may report on the user interface, "you speak faster with Joe than most contacts."

Similar methods may be used to filter communication events for a specified group of users, such as the work group which the user has indicated to be monitored. In this case, any communications with all members of the work group are those for which monitoring takes place. This is accomplished by monitoring those communications to and from addresses contained within the work group grouping.

FIG. 2F(d) illustrates a user interface 278 providing feedback to the user for communications with social media services such as social media app 254*a*. Thus, this solution may also be used to monitor behavior for the user on one or more social media platforms. The behavior conclusions are drawn by the system 250 from an analysis of the user's activity on the one or more social media platforms by the one or more social apps such as social media app 254*a* communicating with the behavior management app 206*a* and sending content related to the user's social activity to the behavior management server 202 for analysis. The behavior management server 202 in turn analyzes the user's social media activity and draws conclusions about the user's communication behavior. The conclusions are used to produce feedback for the user.

Thus, in the example, the system 250 on user interface 278 reports that, on social media 1, the user "tends to complain quite a bit." On social media 2, the system 250 reports that "you wear the same outfit 40% of the time in your video posts." On social media 3, the system 250 reports that 20% of user postings are about social issues and 80% are about the user's family. Any suitable aspect of social media interaction may be monitored. User activity on multiple social media platforms may be broken out among the respective platforms as illustrated in FIG. 2F(d) or may be aggregated for all social media platforms. Such operation and reporting is controllable by the user settings managed through the behavior management app 206*a* on the first user device 206.

In another embodiment, the aggregate analysis provided in FIG. 2F(d) may also include assessment and advice with regards to a user's emotional state. Emotional contexts may be inferred by any of the channels illustrated in FIG. 2F: the frequency, tone, and specific vocabulary used in communications or by visual expressions and gestural actions. Emotional contexts may be determined for an extended length of time (e.g. every Monday, all of August, user 208's birthday week) or for ephemeral events (or markers) that are observed in communications. Observance and correlation of emotional contexts may not or may not provide different specific actions (e.g. "smile more" or "use more contemplative delays") and these contexts may also inform the behavioral application 206*a* or create additional criteria for the AI/ML models to better personalize the suggestions for each user 208.

As can be seen then, systems in accordance with the various aspects described herein solve the noted technical problem of a lack of feedback for persons involved in communications such as electronic media like texting, email, voice and video calls. The disclosed system automatically monitors aspects of the communication and analyzes the user's voice, posture, gestures, words and other behavioral aspects that are otherwise unconscious or unknown to the user. Analysis may include both known or unknown emotional states of the user as well. The analysis includes developing feedback information to share with the user to provide insight into how the user communicates with others through the various methods or media. Moreover, the analysis and feedback provide the user with information about how they are perceived when communicating, particularly when using electronic channels. The user has access to a number of settings to control what communications with what other persons are monitored, what communication methods or channels are monitored, and what behavioral aspects are evaluated and presented to the user.

Figure 2G:
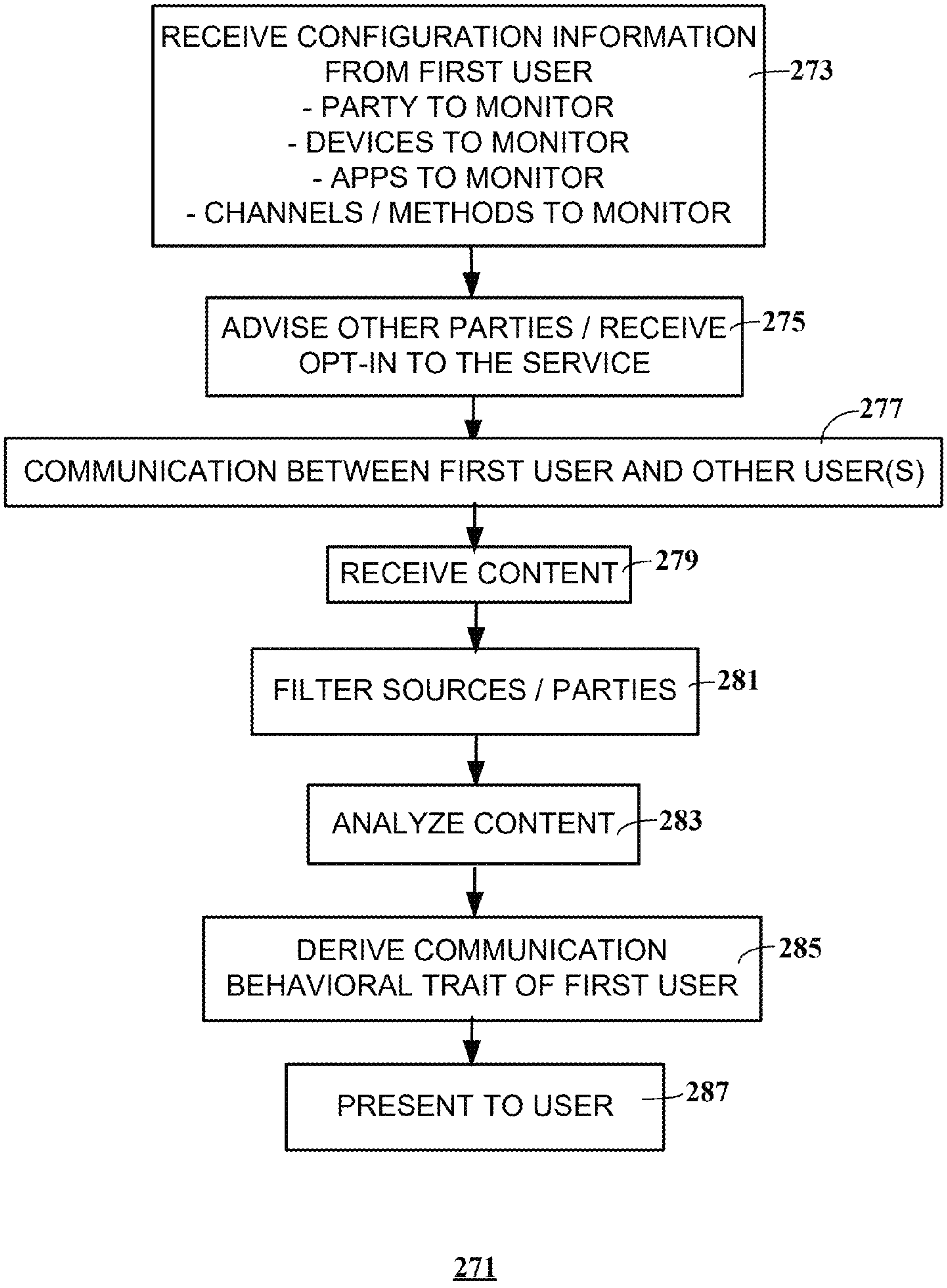
FIG. 2G depicts an illustrative embodiment of a first method in accordance with various aspects described herein.

FIG. 2G depicts an illustrative embodiment of a first method 271 in accordance with various aspects described herein. FIG. 2G illustrates method 271 that outlines the process of monitoring and analyzing user communications, as supported by the system architecture in FIG. 1, FIG. 2A and FIG. 2D. The communications network 125 from FIG. 1 provides the infrastructure for connectivity and data exchange, enabling the system to facilitate communication monitoring. In FIG. 2A, the user device 206, equipped with a device app 206*a*, interacts with various communication apps and servers, collecting data for analysis by the behavior manager of server 202 to implement a communication behavior insight service.

The process of method begins with step 273, where configuration information is received from the first user. This includes details about the party to monitor, devices to monitor, apps to monitor, and channels or methods to monitor. This step links to the behavior manager of server 202 in FIG. 2A, where the user configures the monitoring settings. The user may be presented with a user interface on a display of the user device, for example, to configure the service and select the specific options for the service and the feedback information to be provided.

Next, in step 273, other parties are advised about the service and the operation to detect and collect their communication information. The parties may be given the choice to opt-in to the service ensuring compliance with privacy requirements. Any other manner of ensuring privacy and confidentiality may be used. In the case of social media communications, no such opt-in may be required since the communications of the user are broadcast to many users.

Step 277 involves the actual communication between the first user and one or more other users, facilitated by the network infrastructure depicted in FIG. 1. Such communication may be according to any selected format or application such as texting, email, voice communications and others. Generally, a user device such as a mobile phone, tablet computer or laptop computer is used by the participants to the communication. In some cases, the communication may occur face-to-face without the intervention of electronic media. However, the sound and sights of a face-to-face communication may be captured by nearby devices such as microphones, cameras and other sensors.

The system then proceeds to step 279, where content from the communication is received. In the example, of FIG. 2A, the content is received at the server 202 which implements the communication behavior insight service. The server 202 is interposed between the parties and operative to collect data about all aspects of the communication, in conjunction with applications such as device app 206*a* and device app 210*a* operating on the participants' user devices. The received content may be filtered in step 281 to identify relevant sources or parties, aligning with the data collection process managed by the device app 206*a* in FIG. 2A. In a related embodiment, group communication patterns when the first user participates in communications with multiple other users simultaneously, including role analysis and interaction patterns, may also be applied in step 279.

In step 283, the content is analyzed to derive communication behavioral traits of the first user, as performed by the server 202 using AI and machine learning techniques. This analysis is crucial for providing insights into the user's communication patterns. Finally, in step 287, the derived communication behavioral traits are presented to the user, offering valuable feedback on their interactions, similar to the insights provided in FIG. 2B. FIG. 2E and FIG. 2F provide examples of presentation of feedback to the user who would otherwise lack any feedback and insight into how the user communicates due to the use of electronic media such as email, texting and voice calls. This comprehensive process enhances the user's understanding of their communication behaviors.

Figure 2H:
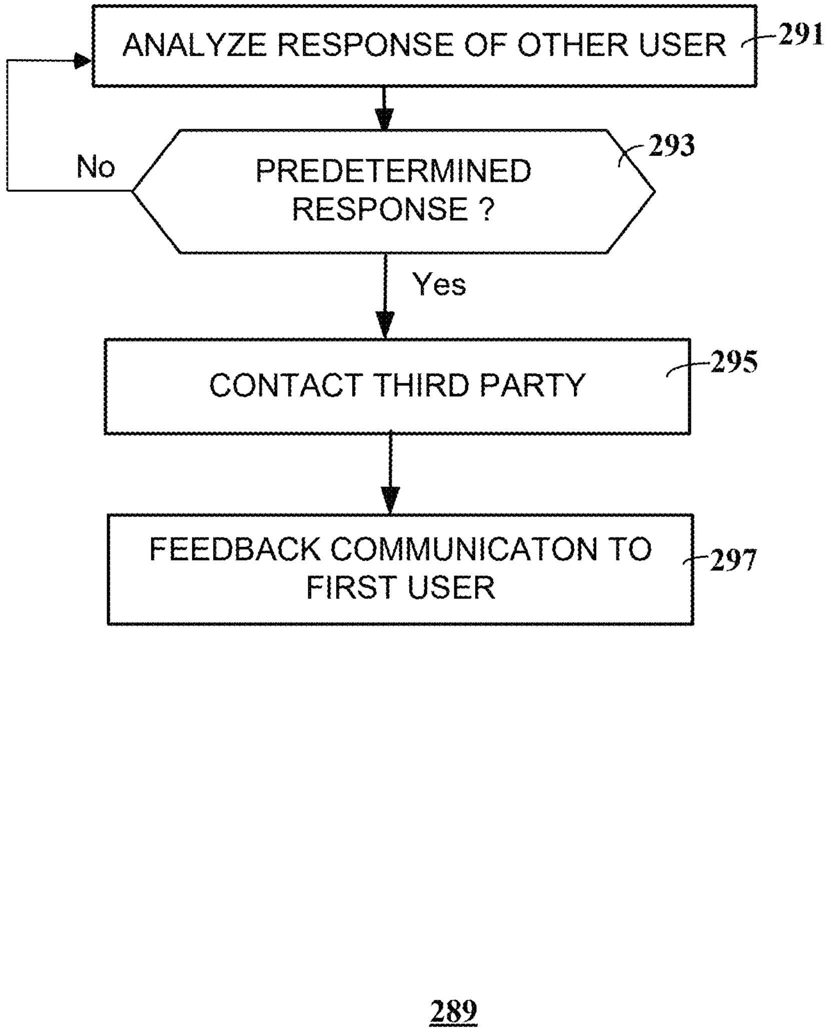
FIG. 2H depicts an illustrative embodiment of a second method in accordance with various aspects described herein.

FIG. 2H depicts an illustrative embodiment of a second method 289 in accordance with various aspects described herein. The method 289 may be performed in associating with the communication behavior insight service implemented by the server 202 of FIG. 2A.

In some embodiments or examples, a first user is communicating with a second user such as a family member (Dad in FIG. 2A) or a coworker (Joe in FIG. 2D). It may occur that the second user has an extreme reaction to the conversation or communication. However, in an extreme case of the first user getting no feedback due to the electronic nature of the communication, the first user is unaware of the extreme reaction. In such a case, a third party may be notified to intercede and feedback may then be presented to the first user.

Thus, as the communication is progressing, at step 291, the server 202 or other component monitors and analyzes the response of the other, second user, such as Dad or Joe, to statements or actions of the first user. Such analysis may be performed by an AI or ML system monitoring the data of the communication.

At step 293, the method 289 includes determining if the second user has a predetermined response. The predetermined response may be any response that may require action or intercession by another person. For example, if the first user tells Dad, as the second user, some alarming information in a voice call, Dad may have an extreme reaction that threatens his health. If the extreme reaction matches the predetermined reaction (such as Dad drops the phone), at step 295 a third party such as Mom, who lives with Dad, may be contacted to check on Dad and verify his condition.

In a second example, the communication is between the first user who is the work supervisor of Joe as second user. The first user informs Joe of some work policy and at step 291 the method 289 includes an operation of analyzing Joe's response. If Joe's response to being informed about the work policy matches a predetermined response, at step 295 a third party may be contacted. In an example, if Joe demonstrates anger at being informed of the policy in a text message, step 295 may include contacting a human resources representative to intercede and assist Joe in this instance. Since the first user is communicating with Joe electronically, through text messages, the first user gets no visual or audible feedback to learn how the information about the work policy has affected Joe. However, the method 289 automatically detects Joe's response, compares the response with one or more predetermined responses and contacts a third party as appropriate. If, at step 293, the predetermined response is not detected, the communication continues and analysis of the communication continues as well.

At step 297, the first user is provided with feedback that would otherwise not be available. For example, the feedback may report the strong response by Dad or Joe and identify what conversational behaviors may have prompted the strong response, such as word choice, tone of voice, or use of electronic media to deliver important information.

While for purposes of simplicity of explanation, the respective processes are shown and described as a series of blocks in FIGS. 2G and 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Alternate embodiments of the subject matter of the disclosure could include expanding the system to incorporate additional communication platforms and devices. For instance, the system could be adapted to monitor and analyze communications across emerging social media platforms or virtual reality environments, providing insights into user interactions in these new contexts. Additionally, the system could integrate with wearable technology, such as smartwatches or fitness trackers, to gather biofeedback data that could enhance the analysis of communication behaviors by correlating physiological responses with communication events. Furthermore, the system could be extended to support multilingual analysis, allowing it to provide insights into communication behaviors across different languages and cultural contexts, thereby broadening its applicability and usefulness in diverse global settings.

Figure 3:
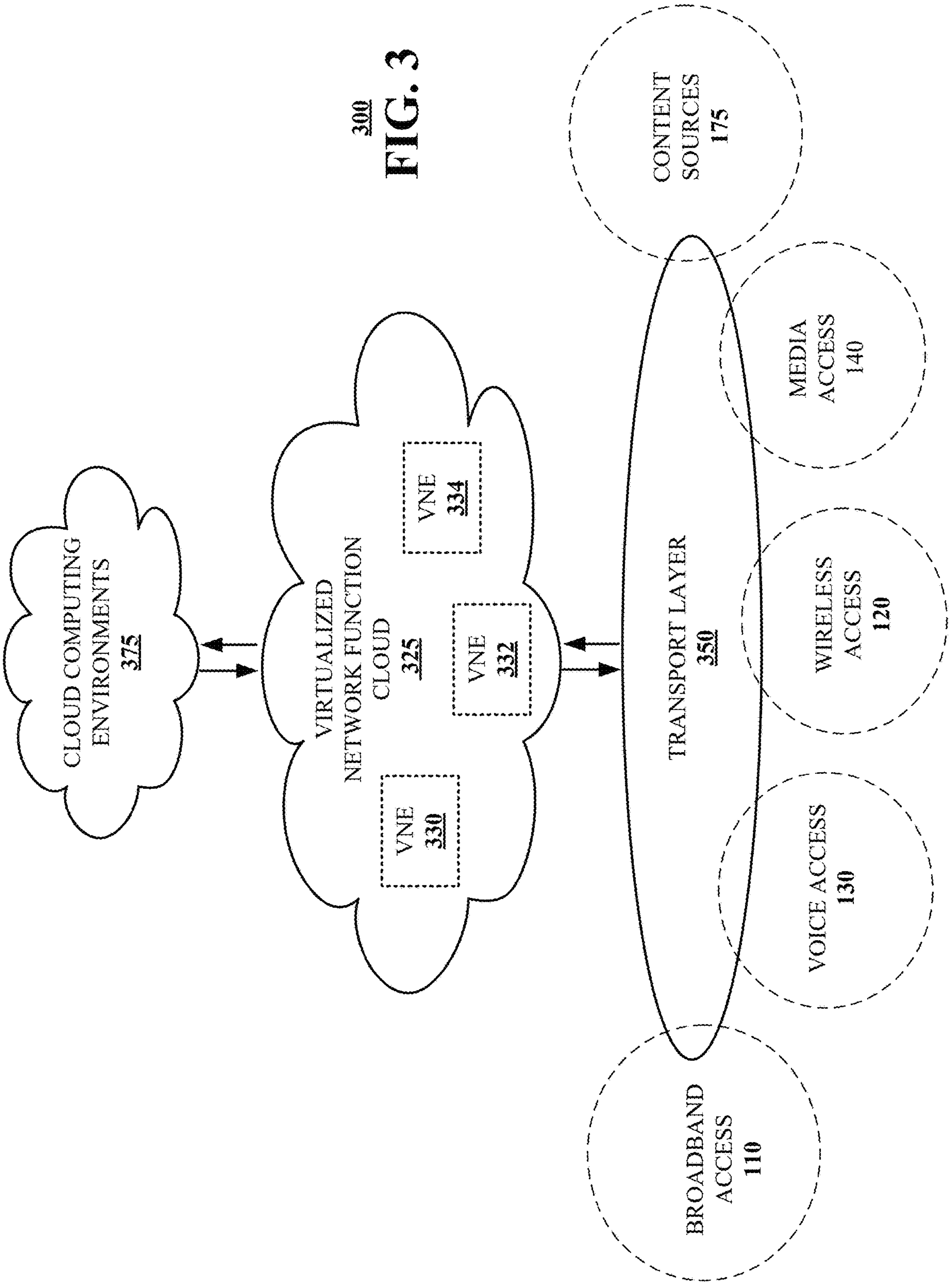
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, system 250, method 271 and method 290 presented in FIG. 1, FIG. 2A, FIGS. 2B, 2D, FIG. 2G, FIG. 2H, and FIG. 3. For example, virtualized communication network 300 can facilitate in whole or in part collecting content from a conversation by a first user with other users, analyzing the content to identify a communication behavioral trait of the first user and presenting information about the communication behavioral trait to the user as feedback to provide the user with insight about how the user communicates, especially using electronic media.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
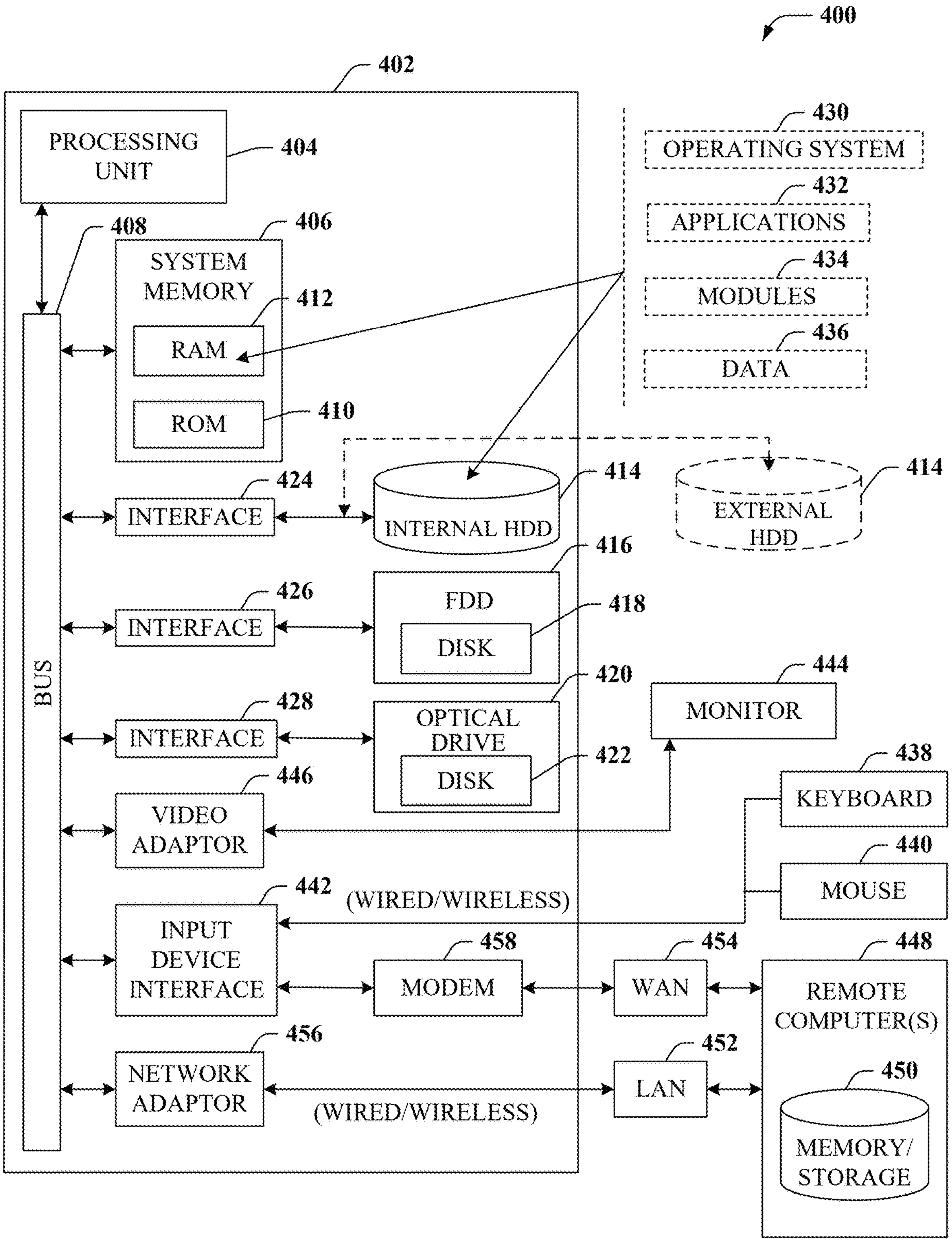
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part collecting content from a conversation by a first user with other users, analyzing the content to identify a communication behavioral trait of the first user and presenting information about the communication behavioral trait to the user as feedback to provide the user with insight about how the user communicates, especially using electronic media.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
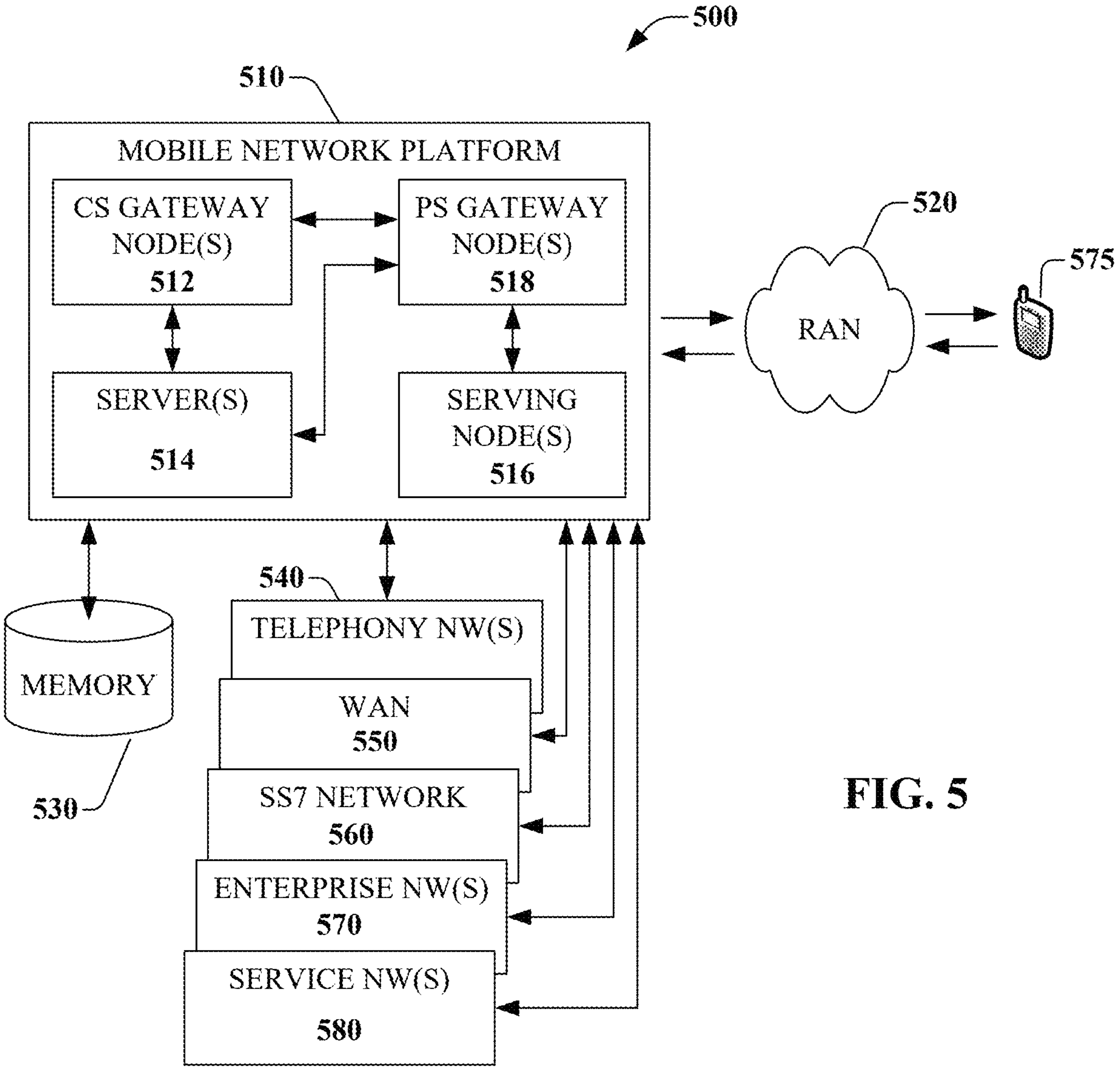
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part collecting content from a conversation by a first user with other users, analyzing the content to identify a communication behavioral trait of the first user and presenting information about the communication behavioral trait to the user as feedback to provide the user with insight about how the user communicates, especially using electronic media. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers;

and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
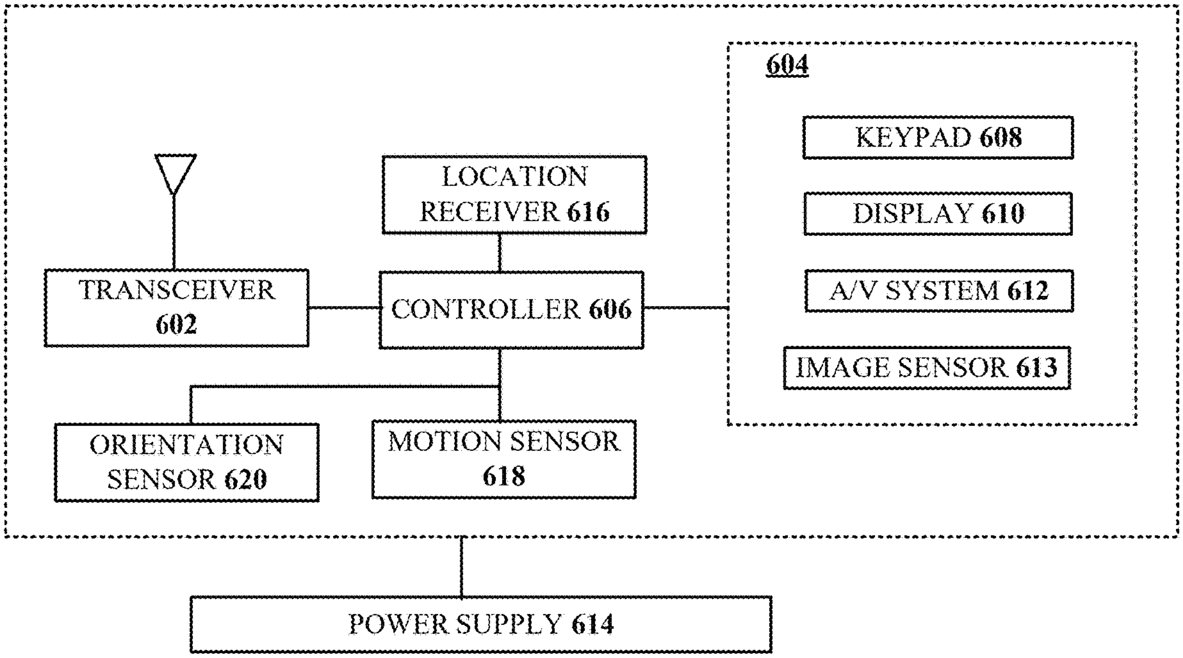
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part collecting content from a conversation by a first user with other users, analyzing the content to identify a communication behavioral trait of the first user and presenting information about the communication behavioral trait to the user as feedback to provide the user with insight about how the user communicates, especially using electronic media.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:

receiving, by a processing system including a processor, content related to a communication between a first user and at least one other user;

analyzing, by the processing system, the content to derive at least one communication behavioral trait of the first user;

analyzing a response of the at least one other user to the communication between the first user and the at least one other user, wherein the analyzing the response occurs during the communication between the first user and the at least one other user;

detecting a predetermined response of the at least one other user to the communication between the first user and the at least one other user;

presenting, by the processing system, to the first user at a user device of the first user, information about the at least one communication behavioral trait, the presenting to provide insight to the first user about how the first user communicates; and initiating a feedback communication to the first user, the feedback communication providing an indication of predetermined response of the at least one other user.

2. The method of claim 1, comprising:

receiving, by the processing system, configuration information for monitoring the communication behavioral trait of the first user; and monitoring, by the processing system, one or more communications by the first user with one or more other users, wherein the monitoring is according to the configuration information.

3. The method of claim 2, wherein the receiving the configuration information comprises:

receiving, by the processing system, media information, the media information identifying one or more communication channels to monitor for the first user.

4. The method of claim 2, wherein the receiving the configuration information comprises:

receiving, by the processing system, other party information, the other party information defining one or more other users of the at least one other user to monitor for the first user.

5. The method of claim 4, wherein the receiving the other party information comprises:

receiving, by the processing system, device identifier information associated with a user device of each respective other user of the one or more other users.

6. The method of claim 1, wherein the analyzing the content comprises:

filtering, by the processing system, the content to identify only selected communications between the first user and a specified second user of the at least one other user;

analyzing the selected communications to derive at least one communication behavioral trait of the first user with respect to the specified second user; and presenting, by the processing system, to the first user at the user device of the first user, information about the at least one communication behavioral trait of the first user with respect to the specified second user to provide insight to the first user about how the first user communicates with the specified second user.

7. The method of claim 6, further comprising:

receiving, by the processing system, information about communications between the first user and the specified second user from multiple communication methods;

analyzing, by the processing system, the information about communications content to derive the at least one communication behavioral trait of the first user; and presenting, by the processing system, information about the at least one communication behavioral trait to the first user for each respective communication method of the multiple communication methods to provide insight to the first user about how the first user communicates according to the multiple communication methods, wherein the information is determined according to a prediction as to how the first user will communicate at a future time.

8. The method of claim 7, wherein the receiving the information about the communication between the first user and the specified second user from multiple communication methods comprises:

receiving, by the processing system, information about one or more of text communications, video communications or audio communications over a network, or information about face-to-face communications between the first user and the specified second user.

9. The method of claim 1, comprising:

analyzing, by the processing system, a response of the at least one other user to the communication between the first user and the at least one other user, wherein the analyzing the response occurs during the communication between the first user and the at least one other user;

detecting, by the processing system, a predetermined response of the at least one other user to the communication between the first user and the at least one other user; and initiating, by the processing system, a contact to a third party, wherein the initiation the contact is based on the predetermined response of the at least one other user corresponding to a response requiring involvement of the third party.

10. The method of claim 1, wherein the detecting a predetermined response of the at least one other user comprises:

receiving biofeedback information for the at least one other user, wherein the receiving the biofeedback information comprises receiving the biofeedback information over a network from a wearable device worn by the at least one other user.

11. A device, comprising:

a processing system including a processor; and a memory that stores executable instructions that, when executed by the processing system, perform operations, the operations comprising:

receiving data of a communication between a first user and a second user, the communication including declarations by the first user to the second user, the declarations made using one or more of a plurality of communication methods;

analyzing the data of the communication to identify at least one communication behavioral trait of the first user, wherein the analyzing comprises detecting first information about a statement by the first user and detecting second information about a response to the statement by the second user;

detecting a predetermined response of the second user based on the second information about the response;

presenting, at a user device of the first user, information about the at least one communication behavioral trait of the first user, wherein the information about the at least one communication behavioral trait of the first user is based on the first information and the second information, wherein the presenting the information about the at least one communication behavioral trait of the first user comprises providing feedback based on the analyzing to assist the first user in understanding how the first user communicates to the second user; and initiating a feedback communication to the first user, the feedback communication providing an indication of predetermined response of the second user.

12. The device of claim 11, wherein the operations further comprise:

during a subsequent communication between the first user and the second user, providing coaching communication to the first user, wherein the coaching communication is based on the at least one communication behavioral trait of the first user.

13. The device of claim 12, wherein the receiving the data of the communication between the first user and the second user comprises:

receiving data about one or more of text communications, video communications or audio communications over a network by the first user using a first user device and the second user using a specified second user device; or receiving information about face-to-face communications between the first user and the second user.

14. The device of claim 13, wherein the receiving information about face-to-face communications between the first user and the second user comprises:

receiving audio information about the face-to-face communications from a microphone; and receiving video information about the face-to-face communications from a camera.

15. A non-transitory machine-readable medium, comprising executable instructions that, when executed by a processing system including a processor, perform operations, the operations comprising:

receiving content data of a communication between a first user and at least one other user, the content data communicated between a first user device of the first user and a second user device of the at least one other user;

analyzing the content data to identify at least one communication behavioral trait of the first user, wherein the analyzing the content data comprises providing at least a portion of the content data to an artificial intelligence or machine learning process and receiving information about the at least one communication behavioral trait of the first user from the artificial intelligence or machine learning process;

analyzing a response of the at least one other user to the communication between the first user and the at least one other user, wherein the analyzing the response occurs during the communication between the first user and the at least one other user;

detecting a predetermined response of the at least one other user to the communication between the first user and the at least one other user;

presenting, to the first user, insight information as feedback to assist the first user in understanding how the first user communicates to the at least one other user, wherein the insight information is based on the information about the at least one communication behavioral trait of the first user; and initiating a feedback communication to the first user, the feedback communication providing an indication of predetermined response of the at least one other user.

16. The non-transitory machine-readable medium of claim 15, wherein the operations further comprise:

receiving the content data of the communication between the first user and the at least one other user at an application server which implements a communication behavior insight service, wherein the application server is in data communication with one or more communication application servers implementing communication applications for communicating among users including the first user and the at least one other user.

17. The non-transitory machine-readable medium of claim 16, wherein the operations further comprise:

receiving, at the application server, user registration information for the first user, the user registration information identifying the first user and the first user device of the first user; and providing access to the communication behavior insight service for the first user, wherein the providing access is responsive to the receiving the user registration information for the first user.

18. The non-transitory machine-readable medium of claim 17, wherein the operations further comprise:

receiving, at the application server, media information, the media information identifying one or more communication channels for receiving content data of the first user;

receiving, at the application server, other party information, the other party information defining one or more other users of the at least one other user for receiving content data of the first user;

receiving device identifier information associated with a user device of each respective other user of the one or more other users for receiving content data of the first user; and storing, as one or more records in an application database associated with the application server, the media information, the other party information and the device identifier information.

19. The non-transitory machine-readable medium of claim 18, wherein the presenting the insight information comprises:

receiving, from the first user, information defining analysis settings for the communication behavior insight service, wherein the analysis settings define one or more selected communication applications of the communication applications for analyzing and one or more selected users of the at least one other user for analyzing.

20. The method of claim 1, wherein presenting the communication behavioral trait comprises:

presenting, via a user interface of the user device, a plurality of communication insights for the at least one other user, the plurality of communication insights including at least two of:

(i) a listening metric indicating an interruption rate during voice communications between the first user and the at least one other user, (ii) a tone metric indicating a change in voice tone of the first user over a time interval, (iii) an attitude metric, (iv) an eye-contact metric for face-to-face communications, (v) a body-position metric for the face-to-face communications, or (vi) an expressions metric for the face-to-face communications.

* * * * *